Nov. 23, 1965   L. E. MYLTING   3,219,437
METHOD OF MAKING OXYGEN STEEL
Original Filed Feb. 6, 1959   2 Sheets-Sheet 1

INVENTOR.
LAURITZ E. MYLTING
BY
WATTS & EDGERTON
ATTORNEYS

Nov. 23, 1965   L. E. MYLTING   3,219,437
METHOD OF MAKING OXYGEN STEEL
Original Filed Feb. 6, 1959   2 Sheets-Sheet 2

INVENTOR
LAURITZ E. MYLTING
BY
WATTS & EDGERTON
B D Watts
ATTORNEYS united States Patent Office 3,219,437
Patented Nov. 23, 1965

3,219,437
METHOD OF MAKING OXYGEN STEEL
Lauritz E. Mylting, Ardmore, Pa., assignor, by mesne assignments, to Buell Engineering Company, Inc., Lebanon, Pa., a corporation of Delaware
Continuation of application Ser. No. 791,748, Feb. 6, 1959. This application Apr. 3, 1962, Ser. No. 184,833
2 Claims. (Cl. 75—51)

This application is a continuation of my copending application, Serial No. 791,748, filed February 6, 1959, now abandoned, for Method of Making Oxygen Steel.

This invention relates to the art of steel making and is particularly concerned with a new method of bringing solids into the oxygen vessel during the making of steel by the oxygen process.

In the oxygen process of making steel, molten pig iron, with or without solid iron scrap, and slag forming materials, are charged into a so-called oxygen vessel for the refining operations. One form of oxygen vessel which has been used in the process has a generally semi-spherical bottom, a cylindrical mid-portion and a truncated conical upper part and a hood which is to rest on the top of the truncated conical part and is provided with a laterally extending flue to communicate with a solids collecting chamber at the base of a stack.

After the molten and solid metal material has been charged into the vessel and the hood has been placed in position, oxygen is introduced through a lance in the hood in a stream traveling at a very high rate of speed, for example, about 2600 miles per hour or over 40 miles per minute. This stream of oxygen creates tremendous turbulence in the molten material and the burning of the oxygen affords the heat necessary to keep the metal and slag in a molten condition as well as to melt any solid metal in the charge. From time to time, quantities of various substances such as lime, limestone, ore pellets and the like are brought into the molten material for use in the refining operation, such as in reducing the sulphur and phosphorous contents and the like in the molten metal as well as for the purpose of controlling the temperature and the condition and composition of the metal and the slag.

In the oxygen steel making process, as practiced prior to the present invention, these substances were introduced into the vessel by gravity from a hopper or hoppers above the hood through an opening in the hood. In moving downwardly in the hood and vessel, these solids encountered the upward and outward flow of the gases traveling at a speed of between about four and about ten feet per second. Since the rate of travel of the solids, particularly the light and fine solids, under the influence of gravity was slow as compared with that of the outgoing gases, most of the very fine solids and large percentages of the larger particles were carried out of the vessel and into the collecting chamber. Thus, the amounts of solids which were carried out of the vessel varied widely. Furthermore, the rate of flow of the solids out of the hopper and into the vessel varied in proportion to the depth of the solids in the hopper and hence was a variable factor. Since the furnace operator had no means of knowing how much of these solids was reaching the molten material, he used more of these solids than was necessary to accomplish the intended purpose. As a result, larger quantities of the solids had to be handled to insure the presence of enough of those solids to get the desired final result. Often the excess adversely effected the condition of the slag as well as the compositions of slag and melt. Alternatively, the high velocity oxygen stream was shut off while the fine or particulate solids were being discharged by gravity into the vessel. Thereby, the loss of fine solids to the outgoing gases was reduced but this saving was at the expense of the time lost in the refining operation while the oxygen stream was not flowing.

The present invention aims to overcome these several disadvantages and handicaps and to provide a new process of making oxygen steel in which the fine solids are delivered into the molten material in an oxygen vessel in uniform, rate controlled, quantity controlled charges while the high velocity oxygen stream is flowing and substantially without loss to the outgoing gases; and attains those aims by a new combination and arrangement of process steps.

In carrying out the present invention various solids such as lime, limestone, iron ore pellets and the like, are discharged from hopper cars into hoppers from which they are removed and transported to separate storage bins. Preferably, these solids are transported from those hoppers to those bins by a stream of air moving at a high velocity, such as may be created by a centrifugal fan or by a positive displacement pump. The rate of transport of the solids may vary between a rate which is almost the full carrying capacity of the air stream at a given velocity and a rate which will transport a given quantity of solids in a given length of time. Normally, a velocity of about 70 feet per second is sufficient to transport such solids with acceptable efficiency and in a suitable length of time. The solids are fed into the stream of air from hopper or bin by any conventional, suitable feeder, for example, a feeder which is vibrated by mechanical, pneumatic or electrical means. Also preferably, the rate of feed of the solids into the air stream is automatically controlled so that the solids carrying capacity of the air stream is utilized to the greatest extent.

When solids are to be transported from one of the bins to the oxygen vessel, the solids are fed out of the bin into a scale bin where they are weighed, and then they are fed into a conveying stream of air which may be furnished by the fan or pump above described, and this stream transports the solids to the oxygen vessel and discharges them downwardly through the hood and into the interior of the vessel at a velocity high enough for even the very fine solids to travel down through the upwardly moving gases and to come into the molten slag and metal in the vessel. This feeding of the solids into the air stream is preferably automatically controlled so that the solids carrying capacity of the air stream is utilized almost to its fullest extent or to any lesser desired extent.

The weight of the solids in the weigh bin may be indicated at all times and, as a result, the operator knows at any given instant the number of pounds of any of the solids which has been discharged into the air stream and carried into the oxygen vessel. Since the rate of feed of the solids is substantially constant, and the total weight of solids discharged into the air stream is known constantly and all the solids fed into the air stream reach the molten material in the oxygen vessel, the result is that the operator is able to use just enough of the solids for the intended purpose and none of the solids is lost to the gases leaving the oxygen vessel.

This ability to add accurately controlled quantities of solids in accurately controlled weights enables the operator to control accurately the temperature and composition of the metal and slag. The condition of the slag can be maintained substantially as desired or adjusted from time to time as may be necessary to obtain the desired action of the slag. As a result of this more or less exact control, the sulphur and phosphorus contents of the metal may be rapidly reduced to below the maximum percentages specified and after these elements are brought into the slag, they may be retained therein by preventing any change in the condition of the slag which would permit either of these elements, particularly phosphorus, to return to the metal.

The present invention is also important in reducing the cost of the refining operation by reason of utilizing all the ingredients without substantial loss to the stack gases, and also by reason of making possible exact controls which avoid correction for over and under supply of ingredients, and thus directly affecting the time required to make a heat of steel.

One form of apparatus which may be used to carry out the present invention is shown in the drawings which accompany and form a part of this specification and in which.

Figure 1:
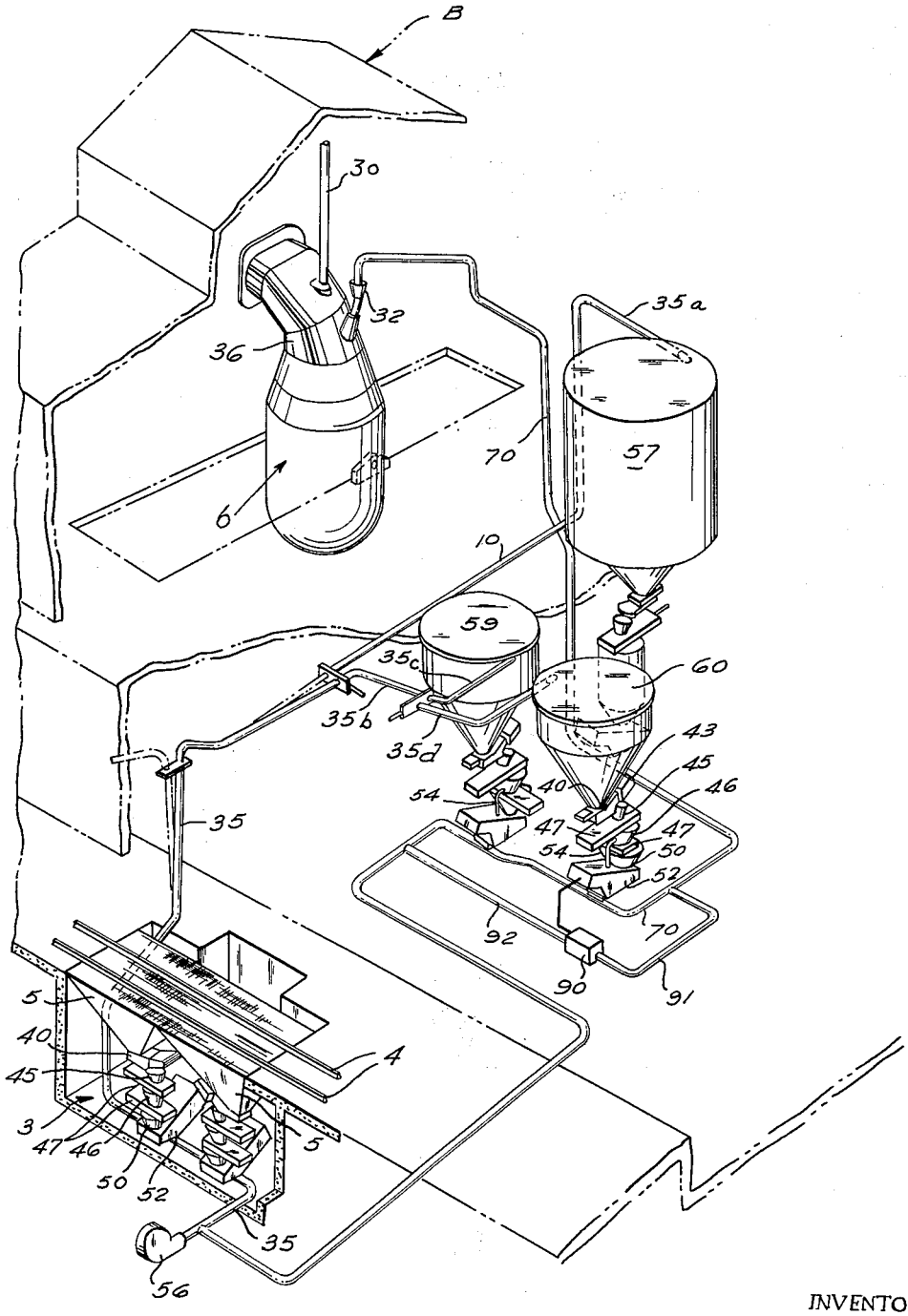
FIG. 1 shows diagrammatically the various parts of a preferred apparatus for transporting solids from a hopper car to the oxygen vessel.
Figure 3:
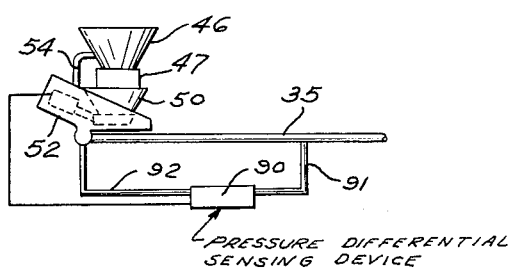

In FIG. 1 a pit 3 in the basement of a building B is shown with a railroad track 4 extending thereover and hoppers 5 in the pit to receive solids discharged from hopper cars on the track. The oxygen vessel 6 has a removable hood 36 resting thereon and having an outlet leading into a solids collecting chamber at the base of the stack (neither the chamber nor stack being shown). A lance 30 for the high velocity oxygen extends down through the hood 36 and a funnel 32 in the hood serves to admit into the space above the bath or melt in vessel 6 fine solids discharged through line 70 from any one of storage bins 57, 59 and 60. Each hopper 5 and its associated parts are alike and hence only one will be described. See FIGS. 1 and 3. Solids from a hopper 5 may be discharged by a feeder 40 into a hopper 45 mounted above a bin 46 and separated therefrom by a grate 47. Bin 46 is connected to weigh bin 50 so that when lower gate 47 is opened, solids may pass from bin 46 into bin 50. A housing 52 surrounds the lower end of bin 50 and opens into pipe line 35 and a vibrating feeder 53 disposed within housing 52 serves to feed solids from bin 50 into pipe line 35. A blower or fan 56 serves to propel air at considerable velocity through pipe line 10 and to carry solids entrained in such air to one or another of the three storage bins 57, 59 and 60. The pipe line 10 includes a flexible part by which it may be connected to line 35a leading to bin 57 or to line 35b leading line 35c which opens into bin 59 or line 35d which opens into bin 60. A pipe 54 connects the interior of housing 52 with the interior of bin 46 and serves to equalize the pressure in bins 46 and 50.

Figure 2:
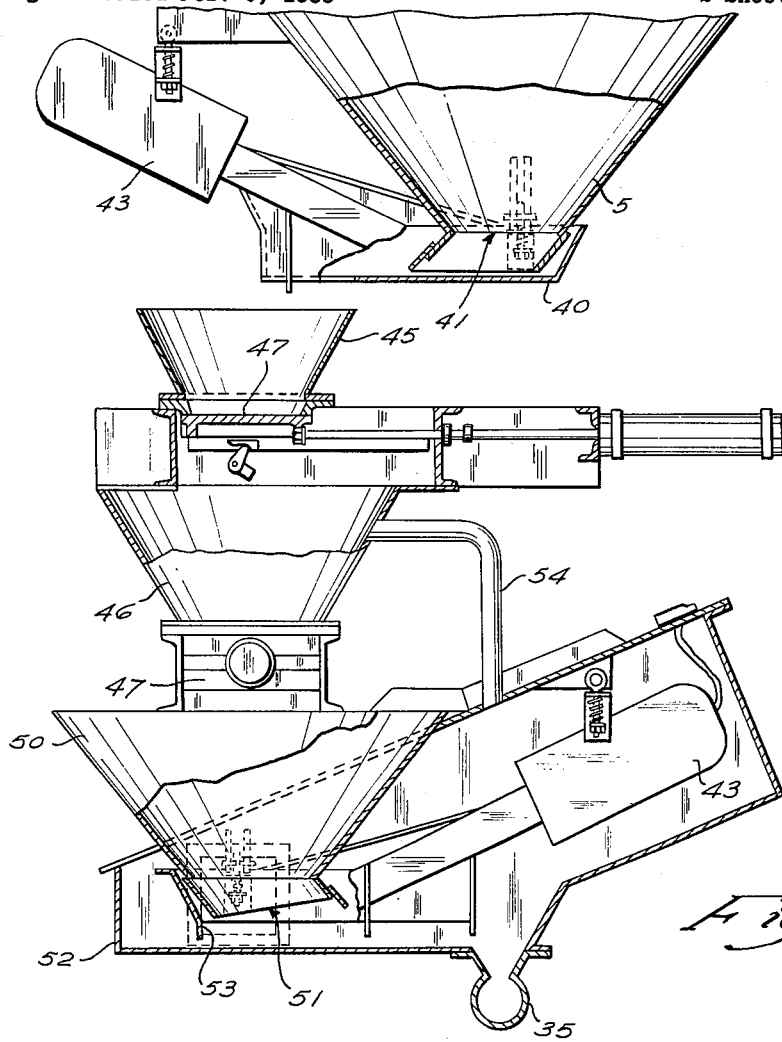
FIG. 2 is a vertical, partly cross-sectional view showing a storage bin, a weigh bin and associated parts for feeding solids from the storage bin into an air stream for transfer into an oxygen vessel; and, FIG. 3 shows, diagrammatically, means for automatically controlling the rate of feed of solids from the weigh bin into the air stream.

Each of the bins 57, 59 and 60 is provided with means for removing solids therefrom, which means include parts like those associated with hopper 5 and described above. See FIGS. 2 and 3. The feeders 52 for the bins 57, 59, and 60 have a pipe line 70 associated therewith, in lieu of the pipe line 35 which serves to transport solids into the tops of bins 57, 59 and 60. Pipe line 70 serves to receive solids withdrawn from any of those three bins and to transport the solids to hood 36 and discharge them through funnel 32 into vessel 6.

Any conventional and suitable feeder may be used to feed solids out of hoppers 5 and bins 50. One such feeder is disclosed in FIG. 2. There, vibrator 43 which may be actuated electrically, pneumatically or mechanically is provided with a feeder comprising a frame with open top and bottom and surrounding the bottom opening 41 of hopper 5 or 51 of bin 50. When the vibrator 43 is actuated and moves the frame laterally, the solids are moved out of housing 40 or 52.

The rate at which solids are fed out of any of bins 57, 59 and 60 and into pipe line 70 may be automatically controlled by a pressure sensitive device 90 which is responsive to difference in pressure existing in pipe line 70 at widely spaced points which are connected through pipes 91 and 92 to device 90. This device translates these differences in pressures into impulses which control the rate of vibration of vibrator 43.

When the difference in pressures in pipes 91 and 92 decreases, the rate of vibration of vibrator 43 and the rate of feeding is increased and when the pressure difference decreases, as when the solids are beginning to deposit in the pipe line 70, the rate of vibration is decreased. In this manner the rate of feed is automatically varied so that at all times the air stream will be carrying a substantially uniform amount of solids and such amount will closely approximate its solids carrying capacity.

The inherent operation of the apparatus just described is substantially as follows. After the vessel 6 has been charged with molten pig iron, scrap and fluxing materials, and the hood 36 has been placed on the upper end of the vessel, the flow of high velocity oxygen through the lance is started. The stream of oxygen penetrates deeply into the molten pig iron and contacts the carbon therein with resultant burning of the carbon to carbon monoxide which escapes as gas through the surface of the melt and flows up through the region or space which extends from the upper surface of the bath or melt up to the hood. When the finely divided or particulate solids are discharged through the funnel by the air stream, the solids and the air stream travel down through the upwardly flowing gases and the solids enter the bath or melt. Thus, when the oxygen and air streams are flowing, the region or space from the top surface of the bath to the hood is filled with descending air and ascending gases from the melt which include the carbon monoxide gas. The oxygen in the air and any free oxygen in the ascending gases burns some of the carbon monoxide to carbon dioxide with the resultant production of considerable heat in close proximity to the fine solids. Those solids absorb some of that heat and carry it into the melt.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. The process of making steel which comprises the steps of discharging a stream of oxygen travelling at a velocity of hundreds of miles per hour a short distance above the surface of molten material in a steel refining vessel, withdrawing through an opening in the upper part of a chamber above the vessel gases flowing from the vessel up through the chamber, and from time to time while said oxygen stream is flowing and said gases are being withdrawn, discharging downwardly into the upper part of said chamber adjacent to said opening an unconfined air stream carrying finely divided solids and travelling at a velocity sufficiently high to propel even the very fine solids down through said upwardly moving gases and into said molten material.

2. The process set forth in claim 1 in which the velocity of the air stream entering the chamber is approximately 70 feet per second.

References Cited by the Examiner
UNITED STATES PATENTS

| | | | |
|---|---|---|---|
| 2,817,584 | 12/1957 | Kootz et al. | 75—60 |
| 2,902,358 | 9/1959 | Kalling et al. | 75—60 |
| 2,950,186 | 8/1960 | Allard et al. | 75—52 |
| 2,991,173 | 7/1961 | Trentini et al. | 75—60 |
| 3,010,820 | 11/1961 | Graef et al. | 75—52 |

BENJAMIN HENKIN, *Primary Examiner.*